United States Patent Office 3,207,333
Patented Sept. 21, 1965

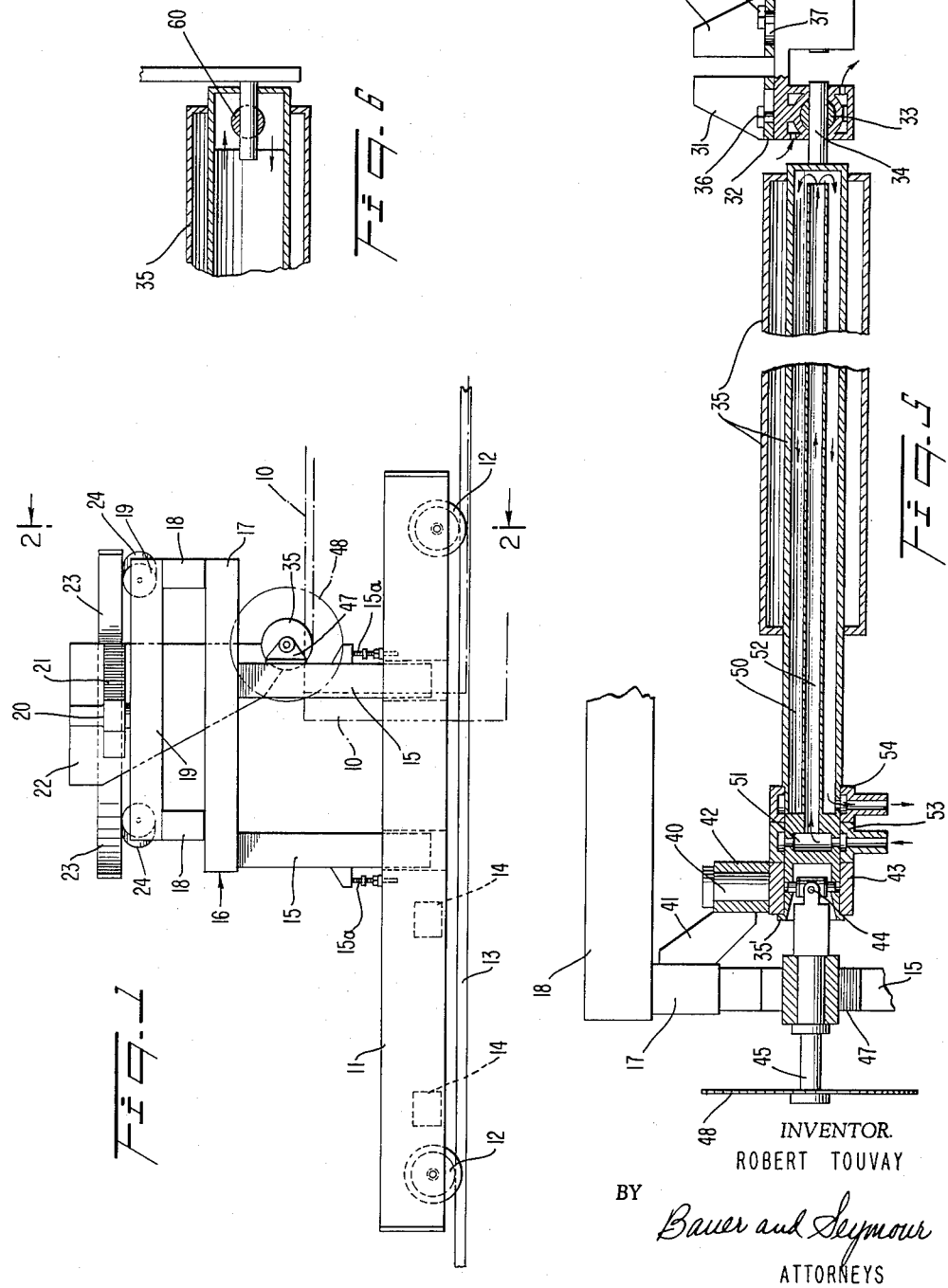

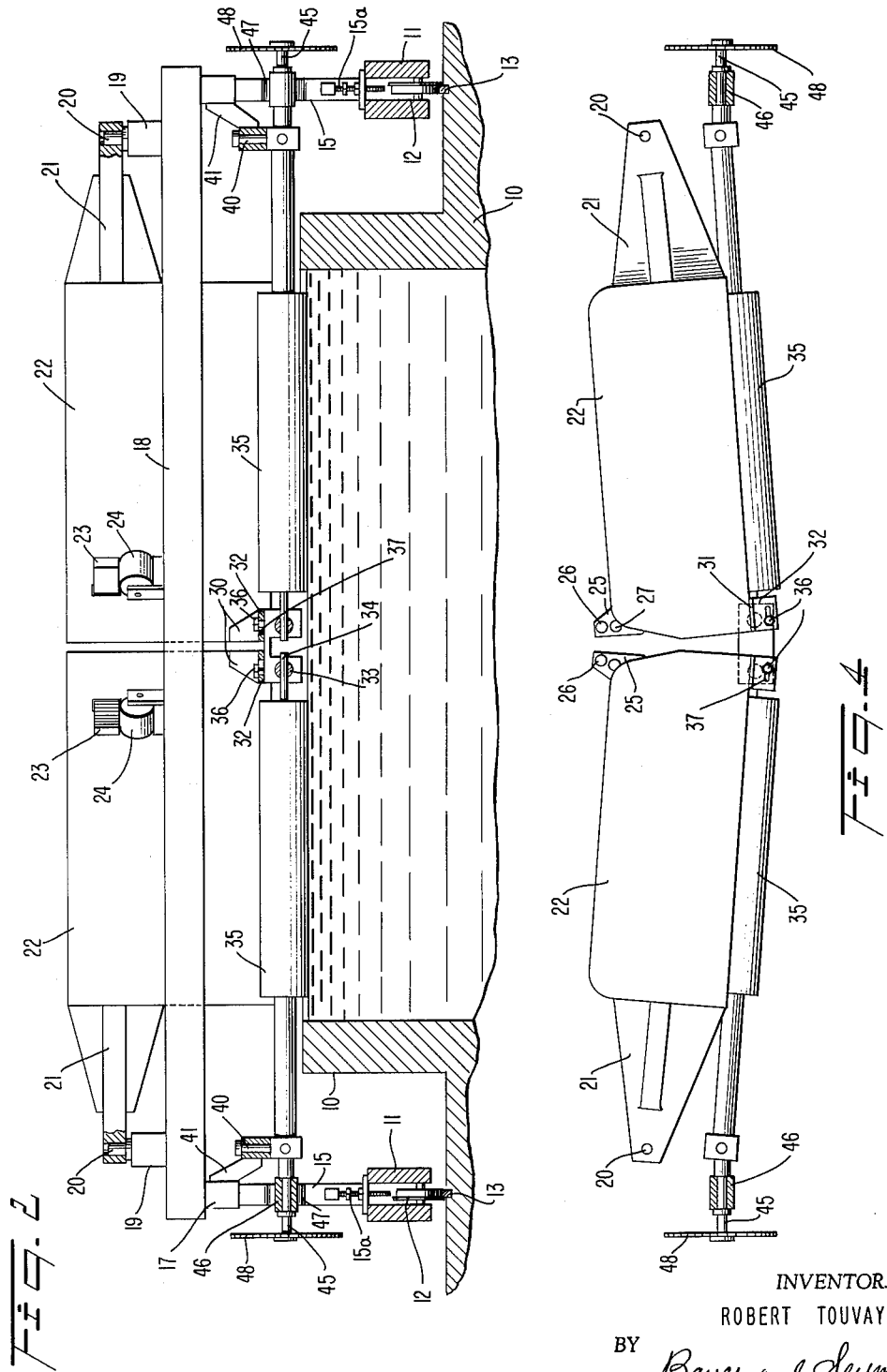

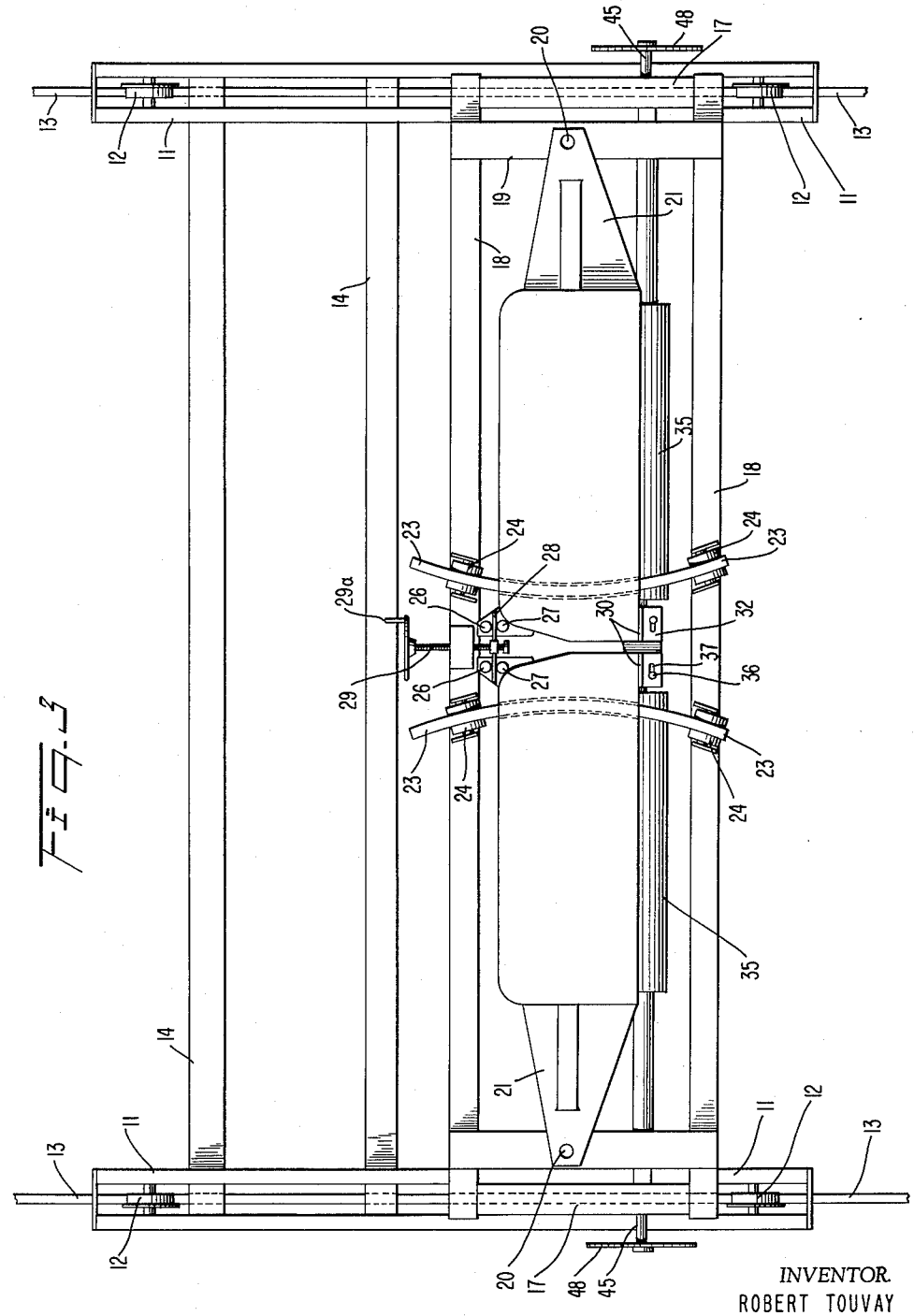

3,207,333
LOADING MACHINERY
Robert Touvay, Paris, France, assignor to Compagnie de Saint-Gobain, Neuilly-sur-Seine, France
Filed May 2, 1962, Ser. No. 191,975
Claims priority, application France, May 3, 1961, 860,583
4 Claims. (Cl. 214—18)

This invention relates to loading machinery, particularly to loading machinery which delivers finely divided materials to receptacles. The invention is particularly adapted to the feeding of glass furnaces the raw materials of which become glass upon melting and the invention will be described in that connection without limiting its general utility.

In loading glass furnaces with raw materials after the glass level has been established the raw materials are ladled into hoppers which distribute the materials on the surface of the molten glass across the head end of the furnace. The floating materials form a floe on the surface of the bath which is not always uniformly distributed and consequently does not perfectly absorb the heat of the furnace. In order to move this floe into the furnace it has been proposed to use a rotating roller which, extending across the bath, and being provided with projections, catches the raw materials and moves them into the furnace. It is also known to direct the raw materials layer in particular ways so as to improve melt efficiency, for instance, by moving the materials to particular locations such as toward one side wall or toward both side walls of the furnace.

This invention has as an object to provide loading machinery which is capable of distributing finely divided materials evenly upon the surface of molten glass and of moving the materials in the directions and at the velocities which will best contribute to the efficiency of furnace performance.

The objects are accomplished, generally speaking, by loading apparatus comprising pivotally mounted hoppers, rollers mounted at the discharge orifices of the hoppers transversely to the tank, means to drive the rollers, and means to swing the hoppers about their pivots. Each of said rollers, extending about the half width of the tank at the feeding station, is mounted to swing about an axis adjacent its outer end, normal to the surface of the glass, and to rotate about an axis parallel with said surface.

Such a device is applicable to novel furnaces having a width reaching and even exceeding ten meters, for which the use of a single roller is very difficult due to its heavy weight and the large diameter needed to avoid bending.

It is an object of this invention to provide a device capable of easy and efficacious guiding of the composition onto the melting glass and control at any moment of its direction of movement onto the glass surface.

The above and further objects and novel features of the present invention will more fully apear from the following detailed description when the same is read in connection with the accompanying drawings. It is to be expressly understood, however, that the drawings are for the purpose of illustration only and are not intended to limit the invention, reference for this latter purpose being had primarily to the appended claims.

In the drawings, wherein like reference characters refer to like parts throughout the several views, FIG. 1 is an elevational view of the loading end of a glass furnace with apparatus of this invention in place;

FIG. 2 is a vertical cross section through the furnace taken in a plane identified by line 2—2 of FIGURE 1, looking in the direction of the arrows;

FIG. 3 is a plan view of the apparatus;

FIG. 4 is a detail of the hoppers in plan view;

FIG. 5 is a vertical axial section through one of the rollers illustrating its supporting, cooling, and driving means;

FIG. 6 is a detail of a modified form of inner roller bearing, partly in section.

In FIG. 1 the numeral 10 indicates the loading end of a glass furnace having end and side walls composed of refractory brick in the usual way. The novel loading apparatus is constructed to extend over the end of the tank so as to be movable horizontally along and over it for a reasonable distance. The loading apparatus includes a frame 11 which is provided with wheels 12 which run on tracks 13 (FIG. 2). The frame is composed of longitudinal members 11a and cross members 14. The longitudinal members are shown as double, receiving between them the wheels and the upright members 15 of a superstructure 16. The uprights 15 are vertically adjustable by means of jacks 15a which are mounted at their lower ends on the frame 11 and support longitudinal beams 17 which in turn support transverse beams 18. The beams 18 support cross pieces 19, the central portions of which support pivots 20 upon which are mounted arms 21 which support the outer ends of aligned hoppers 22—22. The outer ends of the hoppers are thus pivotally mounted. The inner ends of the hoppers are provided with curved bars 23 which ride on rollers 24 supported by the beams 18. The bars are flat and may pass completely through the hoppers without interfering with their proper functioning or they may be externally attached to the hoppers. In FIG. 3 they are shown passing through the hoppers.

The hoppers are provided at their rear inner ends with brackets 25, FIGURE 4, which project and support roller pairs 26, 27 (FIG. 3); between these roller pairs is caught a flat plate 28 which is mounted at its center by a screw thread on screw 29 which is operated by a hand wheel 29a. By turning the hand wheel the inner ends of the hoppers can be pivoted about the pivots 20, riding on the rollers 24. Driven distributing rollers are provided at the discharge openings of the hoppers.

At their lower inner ends the hoppers 22 carry brackets 30 which include vertical flanges 31 welded to the hoppers and horizontal flanges 32 which support bearings 33, FIGURE 5, in which are mounted the axles 34 of rollers 35. Each of the bearings 33 is supported on its flange 32 by a pin 36 which is movable in slot 37. The other end of the roller is supported on a pivot 40 which is axially aligned with the pivot 20. A bracket 41 projects from the longitudinal beam 17 and receives in sleeve 42 the pivot pin which is attached to the bearing 43 (FIG. 5) in which is mounted the end 35′ of roller 35. The end of the roller is hollow and receives a universal joint 44, one fork of which is attached to the drive shaft 45 which is supported in bearing 46 mounted in a bracket 47 on frame member 15. The outer end of shaft 45 bears a sprocket wheel 48 which is driven by appropriate means not shown.

The roller may be cooled, for instance by water flow which is diagrammatically illustrated in FIG. 5, wherein the roller is provided with two chambers 50, 51 which are separated from each other except by a tube 52 which, at one end projects into the chamber 51 and at the other end opens into the chamber 50. Couplings 53, 54 for coolant are connected respectively with chambers 51, 50 and provide for a flow of water throughout the length of the roller as illustrated by the arrows.

During the loading of the raw materials the rollers mounted on the hoppers are able to pivot with said hoppers around their respective pivots in one direction or in the other and to form between them such an angle such that the raw materials loaded on the bath are directed away from the middle axis of the bath, for example toward the walls. Turning of the hopper assembly about pivots 20 is effected by rotation of handwheel 29a, as previously described.

The apparatus has great flexibility and substantially improves the feeding of raw materials as well as the thermodynamics of the glass furnace. The height of the hoppers can be adjusted by the jacks, thus adjusting the level of the rollers with respect to the level of the bath. The hoppers can be pivoted fore and aft and in doing so change the direction of the impulse which is imparted by the driven rollers to the raw materials, thus providing better distribution of the raw materials and a better absorption of heat. By elevating the superstructure the rollers can be made to clear the tank so that the apparatus can be removed for repairs without interrupting the operation of the furnace.

Many variants of the structure above-described will occur to engineers and one of them is illustrated in FIG. 6 wherein the roller 35 has a bearing 60 internally mounted so that the bearing is itself cooled and is consequently better able to stand hot processes.

It will be apparent that this loading apparatus is adaptable to many uses other than the feeding of glass furnaces.

As many apparently widely different embodiments of the present invention may be made without departing from the spirit and scope thereof, it is to be understood that the invention is not limited to the specific embodiments.

In the claims, the central axis of the furnace may be taken as a horizontal line substantially at the level of the molten glass in the tank, and lying in a plane normal to the plane of FIGURE 3, midway between pins 20.

What is claimed is:

1. Apparatus for distributing finely divided material onto the surface of a bath on which it tends to float, comprising, first and second hoppers each having an elongated discharge opening, said openings conjointly extending horizontally throughout a major part of the width of the bath, means supporting said hoppers with their said discharge openings adjacent in substantially end-to-end relation and parallel with the surface of the bath and including first and second pivot means each mounting a respective hopper for pivoting about a corresponding one of first and second vertical axes each laterally offset outwardly of the corresponding hopper, first and second rollers, means journaling each said roller at its inner end on its respective hopper, means carried by said supporting means and journaling each said roller at its outward end for swinging on an axis coincident with a respective one of said vertical axes, means operable to rotate said rollers in unison, and means interconnecting said hoppers for equal and opposite pivotal adjustment each about its own vertical axis, the axis of each said roller being fixed with, parallel with, and immediately below the discharge opening of its hopper, whereby each roller directly receives and uniformly distributes material from its hopper for all positions of angular adjustment of said hoppers about their said vertical axes.

2. The apparatus of claim 1, said means journaling each roller at its inner end comprising first and second contiguous bearings each carried by a respective one of said hoppers, said means journaling each roller at its outer end comprising a pair of brackets each carried by said frame, first and second pivots carried by said brackets each in alignment with a respective one of said first and second axes, bearing means carried by each said pivot and journaling a respective one of said rollers at its outer end, a pair of shafts each journaled in said frame for rotation on an axis generally aligned with the axis of a respective one of said rollers, outwardly thereof, first and second universal joints each connecting the end of a respective one of said shafts with the outer end of a corresponding one of said rollers, and means including said universal joints, operable to rotate said shafts.

3. In an apparatus for delivering and uniformly distributing finely divided batch material to and over the surface of a bath of molten glass in a glass-making furnace, a frame, first and second hoppers each having a lower elongated generally horizontal discharge opening, means mounting said hoppers on said frame for pivotal movement in a horizontal plane, about respective first and second vertical transversely-spaced axes each offset transversely outwardly of its respective hopper, means interconnecting said hoppers and operable to pivot the same equally and oppositely about said axes, from a first position wherein said discharge openings are in substantially horizontal, aligned, end-to-end relation, to a second position wherein said openings are angularly related in a horizontal plane, first and second material-distributing rollers each having a length substantially coextensive with a respective one of said discharge openings, means journaling each roller in contiguous parallel relation with its respective discharge opening and with its axis of rotation in fixed relation with its hopper, to receive directly, material discharged from a corresponding hopper and uniformly distribute the same onto the surface of the bath for all positions of angular adjustment of said hoppers about said first and second axes, and means operable to rotate said rollers in unison.

4. The combination with a glass-melting tank having a longitudinal horizontal center line and an upwardly-facing charging opening extending substantially throughout the width of the tank and horizontally transverse of said line, of a rigid unitary frame mounted adjacent said charging opening, first and second charging hoppers each having a discharge opening to discharge material therefrom directly into said charging opening, means mounting said first hopper on said frame for pivoting about a first vertical axis offset from and at one end of said charging opening at one side of said tank, means mounting said second hopper on said frame for pivoting about a second vertical axis offset from and at the other end of said charging opening at the other side of said tank, said axes being symmetrically disposed on opposite sides of said line, each offset outwardly from its respective hopper, the discharge openings of said first and second hoppers conjointly extending substantially throughout the length of said charging opening and transversely across said furnace, first and second rollers, first and second means journaling the adjacent inner end of each said roller on its respective hopper, third and fourth bearing means journaling the outer end of each roller for rotation on a horizontal axis and for pivoting about a vertical axis coincident respectively with said first and second vertical axes, each said roller having its axis fixed with its hopper and positioned to receive material directly from its hopper and to distribute the same uniformly into said charging opening, and means interconnecting said hoppers for equal and opposite pivotal adjustment about said first and second vertical axes, respectively, from a first position in which the discharge openings of said hoppers are substantially aligned and extend horizontally transverse of said center line, to a second position in which said discharge openings are related in a horizontal plane to make equal and opposite obtuse angles with said center line.

References Cited by the Examiner

UNITED STATES PATENTS

| 1,623,057 | 4/27 | Kingsley. | |
| 2,479,805 | 8/49 | Batchell. | |
| 2,509,390 | 5/50 | Gaunder. | |
| 2,788,115 | 4/57 | Friedman | 198—128 |
| 3,074,568 | 1/63 | Mambourg et al. | 214—18 |

HUGO O. SCHULZ, *Primary Examiner.*